3,268,538
8-SULFONAMIDOQUINOLINES
John H. Billman, Bloomington, Ind., and Robert Chernin, Yonkers, N.Y., assignors to Indiana University Foundation, Bloomington, Ind.
No Drawing. Filed Feb. 26, 1963, Ser. No. 261,200
3 Claims. (Cl. 260—288)

This invention relates to a novel group of selective chelating agents. More particularly, this invention relates to a novel group of metal ion chelating agents based upon the quinoline nucleus.

It has been well recognized for many years that 8-hydroxyquinoline is one of the most useful of all chelating agents since it forms unsoluble precipitates with a wide variety of metal ions. More recently, 8-mercaptoquinoline has been shown to have a similar ability to complex a wide variety of metal ions. Although both of these reagents are extremely useful in the quantitative determination of individual ions, they are of little use in determining the amount of one metal ion in admixture with other metal ions. In other words, both 8-hydroxyquinoline and 8-mercaptoquinoline are quite non-specific or non-selective in their ability to discriminate among ions.

It is an object of this invention to provide a novel quinoline-type chelating agent which is quite selective in its action. It is a further object of this invention to provide novel qualitative as well as quantitative analytical procedures based upon the ability of our novel chelating agents to discriminate among metal ions in solution. Other objects of this invention will become apparent from the description which follows:

In fulfillment of the above and other objects, this invention first provides a novel group of quinoline chelating agents represented by the following formula:

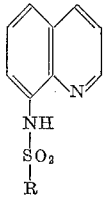

wherein R is a member of the group consisting of $C_1$–$C_5$ alkyl, $C_2$–$C_5$ alkenyl and

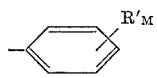

$m$ is a number from 0–2; R' is $C_1$–$C_5$ alkyl, $C_1$–$C_5$ alkyloxy, nitro, halo, and

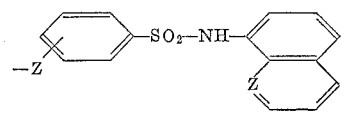

and Z is oxygen, sulfur, sulfonyl or sulfoxide.

In the above formulas, the term $C_1$–$C_5$ alkyl includes groups such as methyl, ethyl, n-propyl, isopropyl, n-butyl, sec-butyl, isobutyl, t-butyl, n-amyl, isoamyl, 2-pentyl, 3-pentyl, 3-methyl-n butyl, 2-methyl-2-butyl, and the like. Similarly, the term $C_2$–$C_5$ alkenyl includes groups such as vinyl, alkyl methallyl, crotyl, 3-methyl-1-pentenyl-1, 3-methyl-2-pentenyl-1, 2-methyl-3-pentenyl-1 and the like. Among the halogens which R' can represent are included fluorine, chlorine, bromine, iodine and astatine.

Also included within the scope of this invention are compounds represented by the above formula but in which the quinoline nucleus is substituted by alkyl, alkenyl, alkoxy, nitro, halo or the like groups, as well as compounds in which a quinoxaline, quinazoline, cinnoline, indole, 1,5-naphthpyridine, 1,6-naphthpyridine, 2H-1,4-benzoxazine, 4H-3,1-benzoxazine, 1,2-benzisoxazole, 1,2-benzisothiozole, pyrido(2,3-b)pyrazine, benzoxazole, benzthiazole, 2,1-benzisoxazole or the like system has replaced the quinoline nucleus, the sole requirement for the latter compounds being that the amino group and one ring nitrogen have the same relative geometry as in 8-aminoquinoline.

The compounds of this invention are prepared by reacting an 8-aminoquinoline with an appropriately substituted sulfonylchloride in the presence of an inert dispersing agent. A basic substance is customarily present to combine with the hydrogen chloride which is produced in the reaction. We prefer to employ pyridine as the dispersing agent since it is also most suitable for reaction with the hydrogen chloride inasmuch as it is a stronger base than 8-aminoquinoline itself and frees any molecules of that substance which might be tied up by hydrogen chloride (in the form of an acid addition salt) for further reaction.

Illustrative compounds coming with the scope of the above formula include the following:

8-(p-toluenesulfonamido) quinoline
8-(p-anisidinesulfonamido) quinoline
8-(o-chlorophenylsulfonamido) quinoline
8-(3,4-dimethoxyphenylsulfonamido) quinoline
8-(m-nitrophenylsulfonamido) quinoline
8-(p-bromophenylsulfonamido) quinoline
3,3'-bis(quinoline-8-sulfamoyl) biphenyl sulfone
3,3'-bis(quinoline-8-sulfamoyl) biphenyl oxide
4,4'-bis(quinoline-8-sulfamoyl) biphenyl sulfide
2,2'-bis(quinoline-8-sulfamoyl) biphenyl sulfoxide
8-(methylsulfonamido) quinoline
8-(n-amylsulfonamido) quinoline
8-methallylsulfonamido) quinoline
8-(2,4-difluorophenylsulfonamido) quinoline The compounds of this invention are useful in precipitating one or more of a group of six metal ions from solution. The metal ions which are precipitated from aqueous solutions thereof by means of an 8-sulfonamidoquinoline of this invention include silver, mercuric, cupric, plumbous, cobaltous and zinc. The precipitate which is formed between one of the above metal ions and an 8-sulfonamidoquinoline of this invention is in the form of a chelate. When the 8-sulfonamidoquinoline is a bidentate compound, these novel chelates can be represented by the following formula:

wherein M is a metal of the group consisting of $Cu^{+2}$, $Co^{+2}$, $Pb^{+2}$, $Zn^{+2}$, $Hg^{+2}$ and $Ag^{+1}$, $n$ is the valence of the metal ion; R is $C_1$–$C_5$ alkyl, $C_2$–$C_5$ alkenyl and

R' is halo, nitro, $C_1$–$C_5$ alkyl or $C_1$–$C_5$ alkyloxy. When M represents a bivalent metal ion, there are, of necessity, two molecules of the 8-sulfonamidoquinoline for each metal ion. When M represents the monovalent metal ion, silver, however, there are also two molecules of 8-sulfonamidoquinoline present for each silver ion in the chelate. In this silver chelate, the second molecule of the 8-sulfonamido quinoline is presumably bound to the silver ion by two coordinate linkages.

In the quadridentate bis(quinoline - 8 - sulfamoyl) biphenyl sulfoxide type of chelating agent there is, of course, only one molecule of the chelating agent per metal ion. These quadridenate chelates can be represented by the following formula:

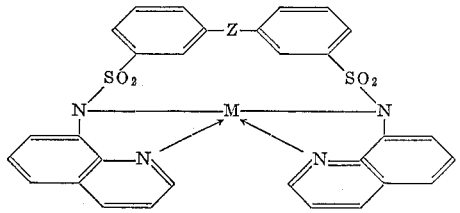

wherein M and Z have the same meaning as hereinabove. As before, when M is silver, the metal is bound by one ionic bond and three coordinate bonds whereas when M is one of the above bivalent metal ions, it is held by two of each type of bond.

The precipitation of copper, cobalt, lead, zinc, mercury or silver ions from solutions by means of an 8-sulfonamidoquinoline represented by the above formula can be employed for purifying metals from their ores, for the quantitative determination of the same metals as ions and other similar uses. In addition, the precipitated chelates are colored and thus their formation can be used as a qualitative indication of the presence of the chelated ion. Each of the above 8-sulfonamidoquinolines gives a characteristic color with each of the above ions. The following table lists the color of the chelate for four chelating agents with each of the above 6 ions.

TABLE.—COLOR OF CHELATES

| Ion | 8-(p-tolylsulfonamido)-quinoline | 8-(2,4-dimethylbenzenesulfonamido)-quinoline | 8-(methylsulfonamido) quinoline | 3,3'-bis(quinoline-8-sulfamoyl)biphenyl sulfone |
|---|---|---|---|---|
| $Co^{+2}$ | Pink | Red | Bright red | Red. |
| $Hg^{+2}$ | Green-yellow. | Pale yellow | Bright yellow. | Pale yellow. |
| $Cu^{+2}$ | Brown | Brown-black | Dark-brown. | Black. |
| $Pb^{+2}$ | Bright yellow. | Bright yellow. | Bright yellow. | Bright yellow. |
| $Zn^{+2}$ | Green-yellow. | Pale yellow | do | Pale yellow. |
| $Ag^{+1}$ | White | Bright yellow | White | Do. |

Other of the 8-(sulfonamido) quinolines of this invention give comparable colors with the above six ions.

This invention is further illustrated by the following specific examples.

*Example 1*

PREPARATION OF 8-(SULFONAMIDO) QUINOLINES

A solution of 4.3 g. (0.03 mole) of 8-aminoquinoline in 50 ml. of pyridine is placed in a 100 ml. flask equipped with stirring means and cooled in an ice water bath. Five and seven tenths grams (0.03 mole) of p-tosyl chlorides is added with stirring to the solution in small portions over a two hour period. The reaction mixture is then poured with vigorous stirring into 200 ml. of cold water. A pink solid precipitates and is separated by filtration. The filter cake is thoroughly washed with cold water. Recrystallization of the filter cake from 95 percent ethanol yields a white crystalline solid melting at about 153–4° C. *Analysis.*—Calc.: N, 4.41; S, 10–72. Found: N, 9.43; S, 10.59.

The following 8-(sulfonamido) quinolines were prepared by substituting the appropriate sulfonyl halide for p-tosyl chloride in the above example.

8 - (2,5 - dimethlbenzenesulfonamido) quinoline; M.P.=148–9° C. *Analysis.*—Calc. N, 8.98; S, 10.26. Found. N, 9.00; S, 10.27.

8-(methylsulfonamido) quinoline; M.P.=143–4° C. *Analysis.*—Calc.: N, 14.61; S, 14.40. Found: N, 12.85; S, 14.32.

3,3' - bis(quinoline - 8 - sulfamoyl) biphenyl sulfone; M.P.=203–4° C. *Analysis.*—Calc.: N, 8.89; S, 15.24. Found: N, 8.98; S, 15.26.

*Example 2*

PRECIPITATION OF CATIONS

A reagent solution was prepared by dissolving 0.1 mole of 8-(p-toluenesulfonamido) quinoline in one liter of 95% ethanol. (Acetone can also be used here.) One milliliter of this solution is mixed with 2 ml. of pH=5.2 acetic acid-sodium acetate buffer and 1 ml. of a 0.1 molar cupric nitrate solution. The mixture was heated at about 80° C. in a water bath for 15 min. and was then cooled. The resulting brown precipitate consisting of the cupric chelate of 8-(p-toluenesulfonamido) quinoline was separated by filtration, and was dried. The chelate contained molecules of 8-(p-toluenesulfonamido) quinoline for each cupric ion.

Other buffer solutions, as for example, a pH=8.4 ammonium hydroxide-ammonium acetate buffer can be used in place of the acetic acid-sodium acetate buffer in the above example.

The above procedure can be employed for separating $Cu^{+2}$, $Co^{+2}$, $Pb^{+2}$, $Hg^{+2}$, $Zn^{+2}$, and $Ag^{+1}$ ions singly or together from solutions containing additional ions including one or more of the following: Li, Na, K the ammonium ion, Tl, Rb, Cs, $Hg^{+1}$, Be, Mg, Ca, So, Su, Fe, Ni, Cd, Ba, Mn, $Pa^{+2}$, Au, Co, Ru, In, Ga, $V^{+3}$, Ti, Sn, Zo, Th, $Pt^{+4}$ and $Sb^{+5}$.

We claim:
1. 8-(methylsulfonamido) quinoline.
2. 3,3'-(quinoline-8-sulfamoyl)biphenyl sulfone.
3. An 8-(sulfonamido) quinoline of the formula:

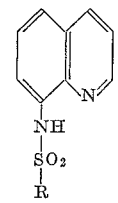

wherein R is a member of the group consisting of $C_1$–$C_5$ alkyl, $C_2$–$C_5$ alkenyl and

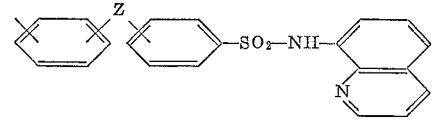

wherein Z is a member of the group consisting of O, S, $SO_2$ and SO.

References Cited by the Examiner

UNITED STATES PATENTS

| 2,335,221 | 11/1943 | Ewins et al. | 260—239.8 |
| 2,876,226 | 3/1959 | Schaeffer | 260—270 |
| 2,876,227 | 3/1959 | Schaeffer | 260—270 |
| 3,000,894 | 9/1961 | Bimber | 260—288 |
| 3,002,001 | 9/1961 | Surrey | 260—288 |

OTHER REFERENCES

Fieser et al.: Advanced Organic Chemistry, page 508.
Bozhevol' nov et al.: Chem. Abstracts, vol. 54, col. 20676a (1960), abstracting USSR Patent 120,029, May 21, 1959.

HENRY R. JILES, *Acting Primary Examiner.*

JOHN D. RANDOLPH, NICHOLAS S. RIZZO, D. M. KERR, D. G. DAUS, *Assistant Examiners.*